United States Patent
Hutchinson et al.

[15] 3,688,504
[45] Sept. 5, 1972

[54] BYPASS VALVE CONTROL

[72] Inventors: Charles A. Hutchinson; Richard L. Henderson; Thomas L. Schilling, all of Cincinnati, Ohio

[73] Assignee: General Electric Company

[22] Filed: Nov. 27, 1970

[21] Appl. No.: 93,271

[52] U.S. Cl..................60/226 R, 60/39.29, 415/17, 415/32, 415/37, 415/28
[51] Int. Cl. ............................F02k 3/04, F02c 9/14
[58] Field of Search...60/39.23, 39.29, 39.03, 226 R, 60/39.28 T; 415/17, 28, 32, 37, 39

[56] References Cited

UNITED STATES PATENTS

| | | | |
|---|---|---|---|
| 2,528,635 | 11/1950 | Bell | 60/226 |
| 2,785,848 | 3/1957 | Lombard | 60/39.29 |
| 2,931,168 | 4/1960 | Alexander | 60/39.29 |
| 2,971,328 | 2/1961 | McLafferty | 60/39.29 |
| 2,978,166 | 4/1961 | Hahn | 60/39.29 |
| 3,006,145 | 10/1961 | Sobey | 60/39.29 |
| 3,091,080 | 5/1963 | Crim | 60/39.29 |

Primary Examiner—Douglas Hart
Attorney—Derek P. Lawrence, Erwin F. Berrier, Jr., Lee H. Sachs, Frank L. Neuhauser, Oscar B. Waddell and Joseph B. Forman

[57] ABSTRACT

An arrangement for bypassing fluid from a location intermediate two independently rotatable compressor rotors includes a bypass passageway, means for varying the bypass flow area and means for controlling the flow area varying means as a predetermined scheduled function of selected parameters of operation of the downstream rotor and for effectively resetting the predetermined scheduled function in response to a signal indicative of rate of change of speed of the downstream rotor.

10 Claims, 3 Drawing Figures

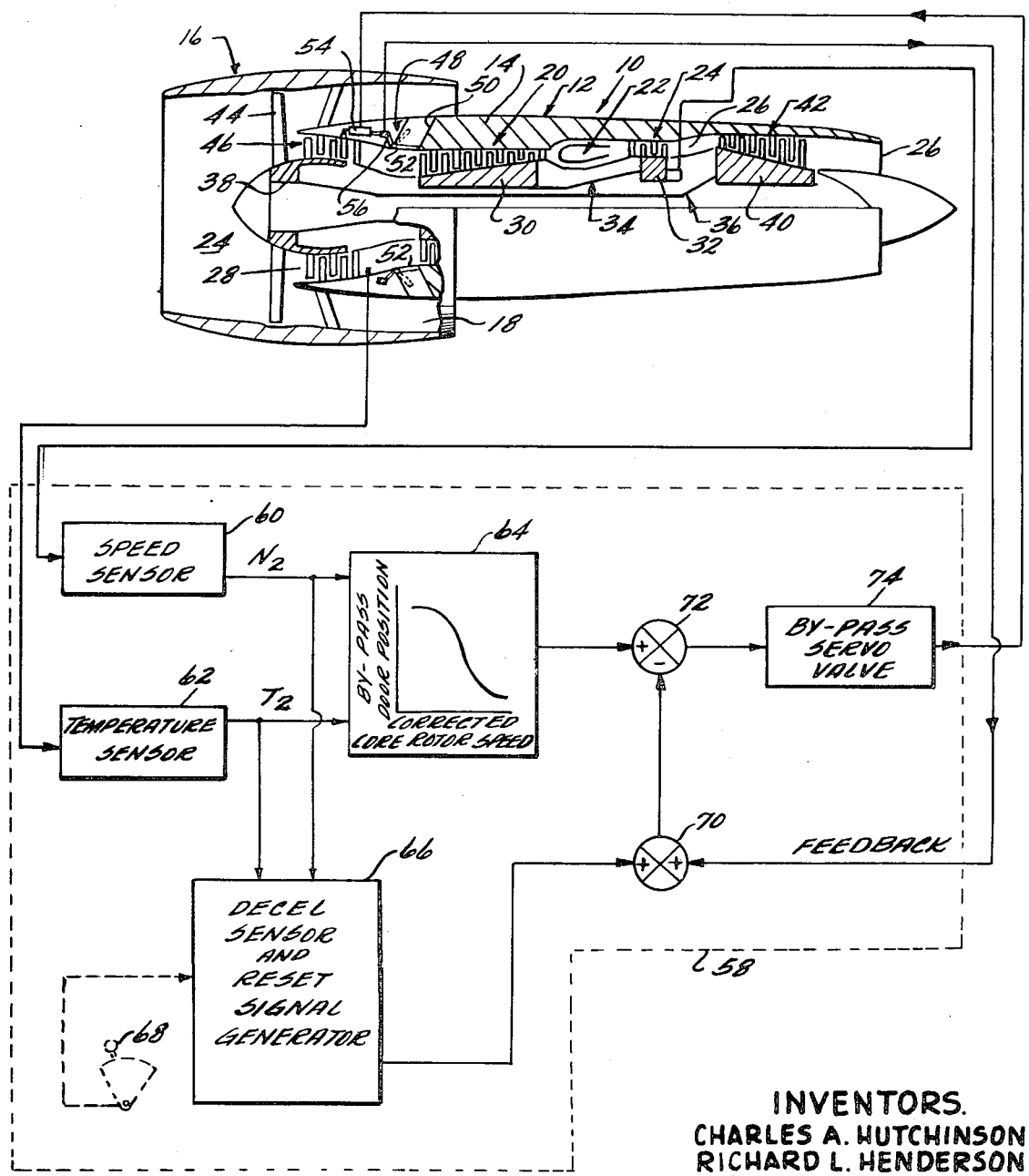

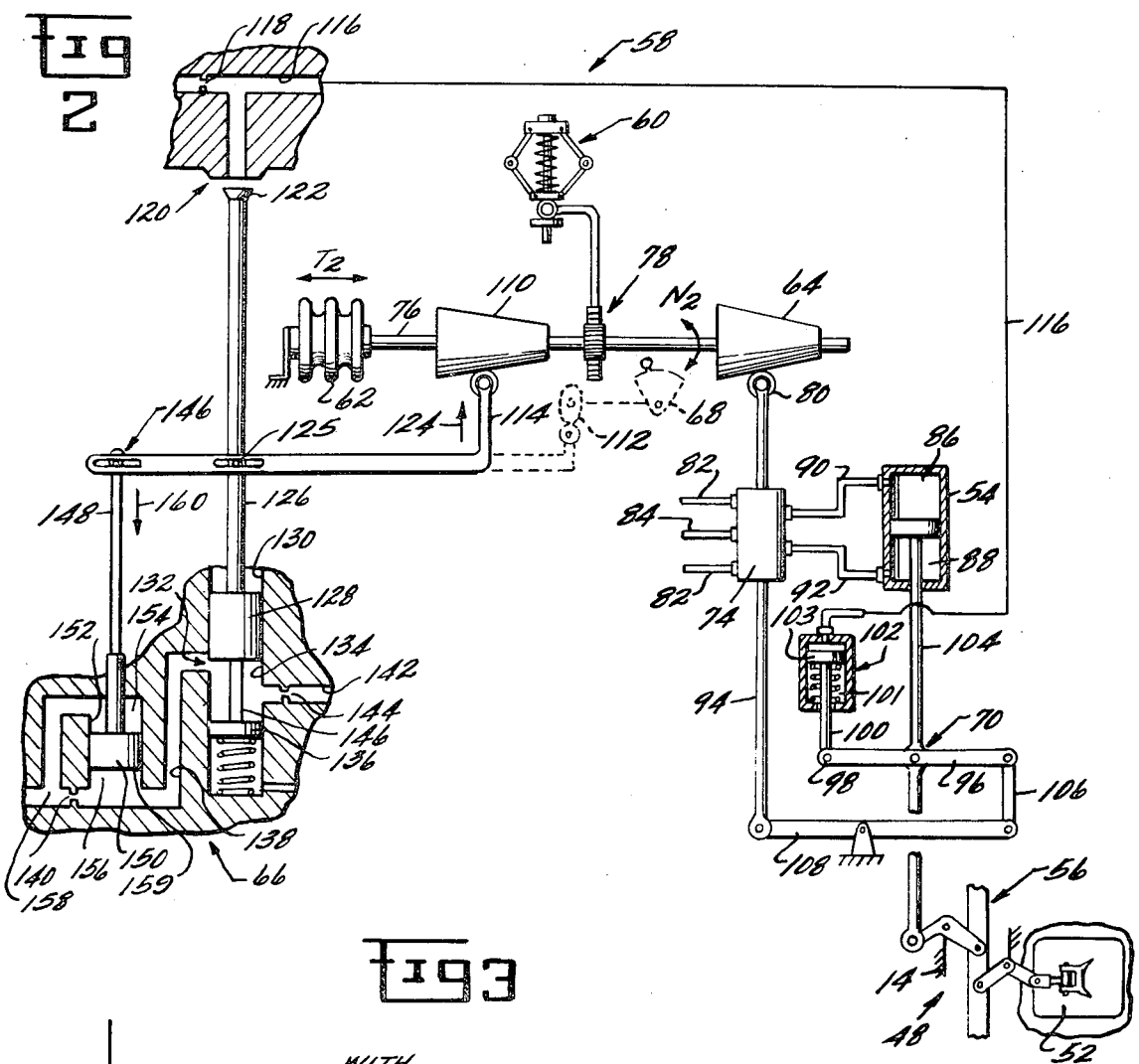
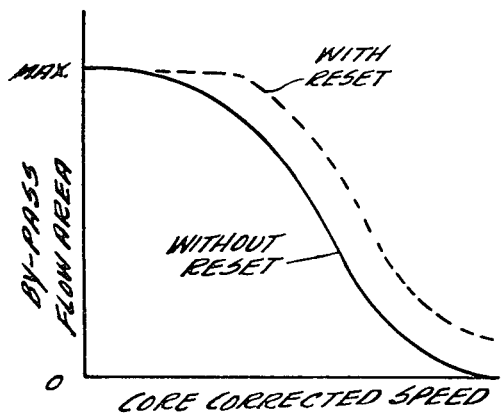
INVENTORS.
CHARLES A. HUTCHINSON
RICHARD L. HENDERSON
THOMAS L. SCHILLING
ATTORNEY

BYPASS VALVE CONTROL

This invention relates to a turbofan engine control system and, more particularly, to a simplified system for controlling a variable bypass valve located intermediate independently rotatable compressor rotors using readily available parameters of engine operation.

In turbofan engines, it is often desirable to increase the overall engine compression ratio (ratio of the pressure of air discharged by the core or high pressure compressor to the pressure of air entering the fan duct) by adding one or more stages of pressurizing blades to an independently rotatable rotor. Where such additional or booster pressurizing stages are disposed within the core engine compressor flow passage, it may be necessary to provide a valve mechanism, such as is shown in copending U.S Pat. application, Ser. No. 34,071, filed May 4, 1970, and assigned to the assignee of this application, for bypassing a portion of the air pressurized by such booster stages during off-design engine operation so as to prevent efficiency losses or aerodynamic stall caused by the back pressuring of the booster stages due to an inability of the core compressor to accept all of the air supplied by the booster stages.

For example, it is customary to design such dual rotor compressors for matched operation at one engine operating point or over a relatively narrow band of engine operation, such as at high altitude cruise. Accordingly, at engine speeds corresponding to lower engine operating points, the high pressure or core compressor may not be capable of accepting all of the flow that the booster stages supply. Without some means to relieve the back pressure on the booster stages, aerodynamic stall of the booster stages could result. Likewise, where there is a difference in the inertia to available torque ratios of the two rotor systems, one rotor will accelerate and decelerate faster than the other in response to throttle movement. When the inertia to available torque ratio of the booster rotor system is greater than that of the core engine rotor, additional mismatch in the flow provided by the booster stages as compared to that acceptable to the core compressor will occur and additional bypass door opening is therefore required during engine deceleration or throttle chops. On the other hand, when the inertia to available torque ratio of the booster rotor is less than that associated with the core engine rotor, such additional mismatch and resultant requirement for additional bypass door opening would occur during engine accel modes.

Since the amount of such excess air will vary with engine speed and depending on whether the engine is in an accel or decel mode, it is highly desirable that the system employed to control the bypass valve be such as to fully modulate the valve flow as well as to provide extra valve flow area in response to a selected condition of engine acceleration or deceleration.

A primary object of this invention, therefore, is to provide a system for modulating the position of a bypass valve as a function of the airflow requirements of the core compressor and in response to selected, readily available parameters of core engine operation.

A further object of this invention is to provide a simplified and reliable system for controlling the position of bypass valves in a multirotor machine as a function of the core engine rotor speed, core engine inlet temperature, and their rates of change.

Briefly stated, the above and other objects and advantages of the present invention are achieved in an apparatus, such as a turbofan engine, of the type having two independently rotatable compressor rotors arranged in serial flow relationship along a common annular passage for pressurizing fluid flow therethrough, by providing at least one bypass passageway for effluxing fluid from between the compressor rotors, means for varying the flow area of the bypass passageway and means for generating a control signal for the flow area varying means as a predetermined, scheduled function of selected parameters of operation of the downstream compressor rotor and for resetting the scheduled control signal to increase the bypass flow area in response to a predetermined rate of change of speed of the downstream compressor rotor. In one form, the scheduled function preferably provides a maximum bypass area at engine start-up, with such maximum area being sized to deliver sufficient air to the core engine compressor during reverse windmilling of the fan.

While the specification concludes with claims particularly pointing out and distinctly claiming the subject matter of this invention, it is believed that the invention will be better understood upon reading the following description of the preferred embodiment taken in connection with the accompanying drawings wherein:

FIG. 1 is an elevational cross-sectional view of a turbofan engine employing an exemplary embodiment, shown in block diagram form, of the control system of this invention;

FIG. 2 is a schematic of the control system of FIG. 1; and

FIG. 3 is a graph showing an exemplary schedule of bypass valve flow area as a function of core rotor corrected speed.

Like reference numerals will be used in referring to like elements throughout the following description of the exemplary embodiment.

Referring now to the drawings and particularly to FIG. 1, a turbofan engine has been shown generally at 10 as comprising a core engine 12 having a supporting structure or casing 14 which projects into the downstream end of an annular fan casing 16 so as to cooperatively define an exhaust duct 18 therebetween.

The core engine 12 comprises a compressor 20, a combustor 22 and a turbine 24 disposed in serial flow relationship along an annular core engine passage 26 having an inlet 28. The compressor 20 and the turbine 24 include, respectively, rotor portions 30 and 32 which are interconnected and define a core engine rotor 34.

A low pressure rotor 36 is suitably supported by the casing 14 for rotation independently of the core engine rotor 34 and includes a fan rotor 38 and a rotor portion 40 of a low pressure turbine 42. The fan rotor includes a plurality of fan blades 44 which extend generally radially therefrom, upstream of the core engine passage inlet 28, and a plurality of booster stages 46 which extend across the core engine passage 26 for pressurizing air prior to delivery to the compressor 20.

Means for bypassing air pressurized by the booster stages 46 prior to delivery to the compressor 20 and the type shown in copending U.S. application, Ser. No. 34,071, filed May 4, 1970, now U.S. Pat. No.

3,638,428, and assigned to the assignee of this application, have been shown generally at 48 as comprising a plurality of bypass passageways 50 and means for varying the bypass flow area thereof. The flow area varying means includes a valve member 52 for closing and variably opening each passageway 50 and suitable actuator means 54 for positioning the valve members through suitable linkage means 56. While the actuator means 54 has been shown and will hereinafter be described as being of the fluid responsive type, it will be appreciated by those skilled in the art that a motor, a ball-screw actuator, or other suitable prime movers may be effectively employed.

With continued reference to FIG. 1, the means of this invention for varying the bypass flow area or for controlling the position of valves 52 has been shown in block diagram form at 58 as comprising: a speed sensor 60 for generating a signal in response to the speed of the core engine rotor 34($N_2$); a temperature sensor 62 for generating a signal in response to the temperature of the fluid discharged by the booster stages 46 ($I_2$); function generating means 64 for scheduling the desired bypass area or bleed valve position as a function of core corrected speed or other suitable combinations of core rotor speed and inlet temperature; a deceleration sensor 66 for generating a reset signal in response to a predetermined rate of change of core corrected speed or, alternatively, in response to a predetermined positional rate of change of an engine throttle control lever 68; summer means 70 for combining the reset signal output of reset means 66 and a positional feedback signal from the valve means 48; summer means 72 for subtracting the output of summer means 70 from the output of function generator 64; and servo means 74 for controlling the position of actuator means 54 and, hence, the position of valve members 52 in response to the output of summer means 72.

In operation, the function generating means 64 computes corrected core rotor speed, using the input signals of sensors 60 and 62, and generates an output signal which is proportional to a predetermined schedule of desired bypass door position or bypass flow area to corrected core rotor speed. The bypass servo means 74 operates on the function generator signal and the positional feedback signal and generates a suitable pressure, electrical or mechanical signal for driving the actuator 54.

When the engine 10 is decelerated, it will be apparent that the core engine rotor speed will decrease more rapidly than that of the low pressure rotor 36 due to its reduced inertia. During such conditions, the difference between the output of the booster stages 46 and the air flow requirements of the compressor 20 may increase rapidly. To provide for adequate stall margin of the booster stages during such conditions while, at the same time, enabling control of the bypass valves 52 as a function of readily available parameters of core engine operation, reset means 66 sense the rate of change of core engine speed and generate a reset signal, which may be fixed or variable, in response to the rate of change in speed of the core compressor or core engine rotor. The reset signal is then delivered to the bypass servo means 74 as a positional error signal through summer means 70 and 72.

While the reset means 66 may conveniently operate on the speed and temperature signals of sensors 60 and 62, other readily available parameters, such as positional rate of change of the engine throttle lever 66, which are indicative of the mismatch in flow between the low and high pressure compressors, may be effectively used.

Turning now to FIG. 2 of the drawings, an exemplary embodiment of the valve control means 58 of this invention has been shown schematically as including a translatable and rotatable shaft 76. The temperature sensor 62 has been shown in the form of a bellows adapted to translate the shaft 76 in response to the temperature of the air at the inlet to the compressor 20 while the speed sensor means 60 has been shown in the form of a fly-ball governor adapted to rotate the shaft 76 in response to core rotor speed through a suitable gear connection 78. The function generating means 64 has been shown in the form of a three-dimensional cam which is suitably contoured to schedule the desired position of bypass doors 52 as a predetermined function of core corrected speed and to provide a control signal to the bypass servo means 74, shown in the form of a pilot valve, through a suitable cam follower 80. The pilot valve includes inlets 82 communicating with a source of pressurized fluid and a return line 84 and is of the well-known type adapted to provide fluid pressure signals to chambers 86 and 88 of actuator 54 through conduits 90 and 92, respectively, in response to the position of cam follower 80 and a link 94. Summer means 70 has been shown as comprising a link 96 which is pivotally connected at one end 98 to a rod 100 of a reset actuator 102. The actuator 102 further includes bias means 101 for urging the actuator piston 103 and the rod 100 to its non-reset position. The summer link 96 is also pivotally connected, intermediate its ends, to the piston rod 104 of actuator 54 to provide a feedback signal which is representative of the position of the bypass doors 52. The feedback signal is then delivered to the pilot valve 74 through links 106, 108 and 94.

The shaft 76 may be provided with a second cam 110 or, alternatively, a cam 112 which is operatively connected to the engine throttle lever 68 to drive a cam follower link 114 and provide an input to the reset means 66 which is indicative of the rate of change of core compressor or core rotor speed.

A source of pressurized fluid communicates with one end of the actuator 102 through a conduit 116 and a suitably sized orifice 118. The conduit 116 is vented through a port 120. A valve member 122 is provided to open and close the vent port 120 and thereby direct pressurized fluid to the actuator 102 or relieve the fluid pressure therein.

When the valve member 122 is disposed in a position opening vent port 120, the piston 103 and rod 100 of reset actuator 102 will be maintained in its non-reset position of FIG. 2 by biasing means 101. With the rod 100 so positioned, a first location is established for the rod/summer link 96 pivot connection 98 wherein the bypass doors are controlled solely as a function of cam 64 and the position feedback signal.

When valve member 122 moves to a position closing vent port 120, pressurized fluid is directed into actuator 102 and actuator piston 103 moves against biasing means 101 and downwardly as viewed in FIG. 2 to establish a second or reset position for the pivot connection 98. In this manner a reset signal is generated which is combined with the feedback signal and delivered to the pilot valve 74 through links 106, 108 and 94. In the embodiment of FIG. 2, the pilot valve 74 is adapted to respond to such reset signal by resetting its pressure output signal to the actuator 54 so as to drive the piston rod 104 downwardly to thereby open the bypass doors 52 or increase the bypass passage flow area by a predetermined amount.

The means for sensing the rate of change of core engine rotor speed or the positional rate of change of the engine throttle lever 68 will now be described for the case of FIG. 1, where the inertia to available torque of the low pressure rotor 36 is greater than that of the core engine rotor 34. The cam 110 or 112 is suitably formed so that cam follower 114 will move in the direction indicated at 124 in response to reductions in core corrected speed or reduced settings of throttle lever 68. The valve member 122 is pivotally connected to the cam follower link, as at 125, through a rod 126. The rod 126 carries a valve land 128 which is movable within a cylinder 130 and functions to vary the flow area of a port or orifice 132. A chamber 134 is defined internally of the cylinder 130 by the valve land 128 and a spaced balance piston 136. The orifice 132 communicates the chamber 134 with a source of pressurized fluid through a passageway 138 and an inlet orifice 140 and is vented through an outlet conduit 142 and a suitable orifice 144. The cam follower link 114 is pivotally connected, as at 146, to a rod 148 of a piston 150 which is slideably received in a cylinder 152 and defines, in cooperation with the cylinder, a rod end chamber 154 and a chamber 156. The chamber 154 is connected to the source of pressurized fluid through a passageway 158 while chamber 156 communicates with the source of pressurized fluid through the inlet orifice 140 and passage 158.

In operation, as the engine decelerates, cam follower 114 pivots about instantaneously fixed connection 146 in the direction indicated at 124 and, through connection 125, moves rod 126 in a closing direction relative to vent port 120. At the same time, land 128 moves to increase the flow area of orifice 132.

The cam 110 or 112 is suitably formed so that for a predetermined rate of change of core engine speed, rod 126 is moved sufficiently to close vent port 120, whereupon reset actuator 102 is pressurized and pilot valve 74 further opens the bypass door 52.

As the orifice or port 132 is opened, the fluid pressure within passageway 134 and, hence, the pressure acting on piston face 159 is reduced, causing piston 150 and pivot connection 146 to move in the direction indicated at 160. Such movement, if not accompanied by continued core engine deceleration of sufficient magnitude, will open vent port 120 and return the valve land 128 to a position wherein the pressure within passageway 134 is sufficient to balance the piston 150.

During periods of core engine acceleration, rod 126 is moved in a direction restricting the flow area of orifice 132 and increasing the pressure within passage 134, whereupon piston 150 moves oppositely to the direction indicated at 160 until the orifice 132 is returned to a position balancing the piston 150. The combined motion of cam follower 114 moving oppositely to the direction indicated at 124 and rod 148 moving oppositely to the direction indicated at 16 results in rod 126 moving in a direction which maintains the vent port 120 open. It will thus be noted that, in the embodiment of FIG. 2, reset means 66 is only operative during periods of core engine deceleration. It should be recognized, however, that for applications wherein the low pressure rotor inertia to torque ratio is less than that of the core engine rotor 34, as for example in a two-rotor turbojet, the cam 110 or 112 may be shaped to effect movement of cam follower 114, in the direction indicated at 124, during periods of engine acceleration.

Referring now to FIG. 3, an exemplary schedule of bypass passage flow area and core corrected speed has been shown with and without reset. Preferably, in the case of the turbofan engine of FIG. 1 and as shown in FIG. 3, the scheduled bypass area is at maximum at low core corrected speeds and decreases as core corrected speed increases. At the same time, the maximum flow area is preferably sized to permit reverse flow in sufficient quantity from the duct 18 to the core compressor 20 to enable satisfactory engine start-up when the fan rotor 36 is reverse windmilling, as for example may occur with sufficient tail wind in aircraft applications.

By providing the reset means 66, the present invention anticipates the slower or faster response, as the case may be, of the fan or low pressure rotor 36 relative to core engine rotor 34, thereby providing additional bypass valve flow area to accommodate an increase in the portion of booster flow which is in excess of the flow that the core compressor is capable of handling and preventing back pressuring and stall of the booster stages.

While the present invention has been shown in connection with a two-rotor turbofan engine and is particularly applicable thereto, it will be appreciated that the invention may be effectively employed in any multirotor engine arrangement such as a two-rotor turbojet and a three-rotor turbofan.

Since the bypass area control means of this invention is adapted to use parameters of core engine operation and since these same parameters are normally used to control engine fuel flow and/or compressor variable stators, the present control means does not require an increase in the number and type of engine sensors.

From the foregoing, it will be appreciated that the present invention provides simplified and reliable means for varying or modulating the bypass air flow from a location in the core engine flow path which is intermediate the core compressor and the fan booster stages or an upstream, independently rotatable compressor as a function of readily available parameters of core engine operation and in a manner minimizing the effect on engine stall margin and engine efficiency.

While an exemplary embodiment has been schematically depicted and described in FIG. 2, it will be appreciated by those skilled in the art that the present invention is not limited thereto. For example, it will be appreciated that the reset means 66 as well as other elements of the valve control means 58 may be schematically depicted and executed otherwise than in FIG. 2 without departing from the fundamental theme of the invention as shown in the block diagram of FIG. 1.

What is claimed is:

1. In an apparatus of the type having a casing structure supporting first and second independently rotatable compressor rotors arranged in serial flow relationship in a common passage for pressurizing fluid flow therethrough, with the inertia to available torque associated with one rotor being greater than that associated with the other rotor, in combination, at least one bypass passageway formed through said casing and communicating with said common passage intermediate said compressor rotors for bypassing fluid therefrom, means for varying the flow area of said bypass passageway, and means for controlling said flow area varying means as a predetermined scheduled function of selected parameters of operation of said second compressor rotor, said control means having means responsive to at least one signal indicative of rate of change of speed of said second compressor rotor for resetting said predetermined schedule, whereby fluid in excess of that which the second compressor rotor can handle is bypassed to prevent back pressuring and stall of said first rotor.

2. The structure of claim 1 further characterized in that said selected parameters of operation of said second compressor rotor include the temperature of fluid at the inlet to and the speed of said second compressor rotor.

3. The structure of claim 1 further characterized in that said reset means is responsive to signals representing the temperature of fluid at the inlet to and the speed of said second compressor rotor.

4. The structure of claim 1 further characterized by and including a throttle lever for manual control of said apparatus, said reset means being responsive to a signal representing the positional rate of change of said throttle lever.

5. The structure of claim 1 further characterized in that said reset means is adapted to generate a reset signal in response to a predetermined rate of second compressor rotor deceleration and said means for controlling said flow area varying means further includes means for sensing the speed of said second compressor rotor and generating a signal in response thereto, means for sensing the temperature of air at the inlet to said second compressor rotor and generating a signal in response thereto, means responsive to said temperature and speed signals for generating a control signal corresponding to said predetermined scheduled function, means for generating a feedback signal in response to the position of said flow area varying means, and means responsive to said control, feedback and reset signals for controlling said bypass area varying means.

6. The structure of claim 5 further characterized in that said flow area varying means includes a fluid actuator, and said control, feedback and reset signal responsive means comprises a pilot valve operative to generate a fluid pressure signal in response to said control signal and a combination of said feedback and reset signals.

7. A turbofan engine including, in combination, a core engine having a compressor, a combustor and a first turbine disposed in serial flow relationship along an annular core engine flow passage, a core engine casing, an annular fan casing defining a fan duct therein, said core engine casing projecting into said fan casing and defining a generally annular duct portion therebetween, a second turbine disposed downstream of and rotatable independently of said first turbine and drivingly connected to a fan rotor located upstream of said core compressor, said fan including at least one stage of blades extending generally radially across said fan duct for pressurizing airflow therethrough and at least one booster stage of blades disposed within said core engine flow passage, upstream of said core compressor, for further pressurizing a portion of said airflow to deliver to said core compressor, at least one bypass passageway formed through said core engine casing and communicating said core engine passage with said annular duct portion at a location intermediate said booster stage and said core compressor, means for varying the flow area of said bypass passageways, and means for generating a signal for controlling said flow area varying means in response to a predetermined scheduled function of the corrected speed of said core engine and for resetting said signal in response to a predetermined rate of change of said core corrected speed to thereby prevent the overpressuring of said booster stages by bypassing air in excess of requirements to said core compressor.

8. The structure of claim 7 further characterized in that said predetermined schedule is adapted to provide a maximum bypass flow area at core corrected speeds corresponding to start-up and idle of said turbofan engine.

9. The structure of claim 8 further characterized in that said maximum bypass passage flow area is sized to direct sufficient airflow for start-up of said core engine during conditions of reverse windmilling of said fan rotor.

10. The structure of claim 7 further characterized in that said control and reset means comprise means for sensing the speed of said core compressor and generating a signal in response thereto, means for sensing the temperature of air at the inlet to said core compressor and generating a signal in response thereto, means responsive to said speed and temperature signals for generating a signal corresponding to said predetermined scheduled function, means for generating a feedback signal in response to the position of said bypass flow area varying means, reset means for generating a signal in response to a predetermined rate of change of said core corrected speed, and means responsive to said scheduled feedback and reset signals for generating and resetting said control signal.

* * * * *